United States Patent [19]

Clingenpeel

[11] 4,284,850
[45] Aug. 18, 1981

[54] DIGITAL MEMORY PROVIDING FIXED AND VARIABLE DELAYS IN A TASI SYSTEM

[75] Inventor: Glenn R. Clingenpeel, Northglenn, Colo.

[73] Assignee: Storage Technology Corporation, Louisville, Colo.

[21] Appl. No.: 3,032

[22] Filed: Jan. 12, 1979

Related U.S. Application Data

[63] Continuation-in-part of Ser. No. 863,903, Dec. 23, 1977.

[51] Int. Cl.$^2$ ............................................. H04J 5/00
[52] U.S. Cl. ..................................................... 370/81
[58] Field of Search .......... 179/15 AS, 15 A, 15 BW, 179/15 BA, 15 BV, 15 AP, 15 BY, 1 SA

[56] References Cited

U.S. PATENT DOCUMENTS

| | | | |
|---|---|---|---|
| 3,644,680 | 2/1972 | Amano et al. ................... | 179/15 AS |
| 3,836,719 | 9/1974 | Clark ................................ | 179/15 AS |
| 4,012,595 | 3/1977 | Ota .................................... | 179/15 AS |
| 4,048,447 | 9/1977 | Maruta ............................ | 179/15 AS |

*Primary Examiner*—Thomas A. Robinson
*Attorney, Agent, or Firm*—Woodcock, Washburn, Kurtz, Mackiewicz & Norris

[57] ABSTRACT

A time assignment speech interpolation system has a random access memory which provides both a fixed and a variable delay between an input speech channel and a transmission facility. Digital samples of the signal detected on an input speech channel are stored for a fixed time in a portion of the memory in order to provide time for switching without clipping and for generation of a channel identifying symbol. If a transmission facility is available, the sample is read out of memory after the fixed delay and reconstituted into an analog signal which is transmitted on the available facility. If no transmission facility is available, the samples are read out of memory after the fixed delay and written into another portion of memory which stores them for variable times until a transmission facility is available. In one embodiment, the portions of the memory assigned to providing variable delay are paired. Starting addresses are at the two extremes of memory locations in a pair, and successive memory locations extend toward the other extreme starting address. In another embodiment, the memory assigned to providing variable delay is segmented. As one segment is filled, it is linked to another available segment. In this embodiment, silence purging logic may also be provided which determines whether any of the samples stored in particular segments represent silence or pauses in the stored speech. If they do, these segments are then classified as available.

4 Claims, 6 Drawing Figures

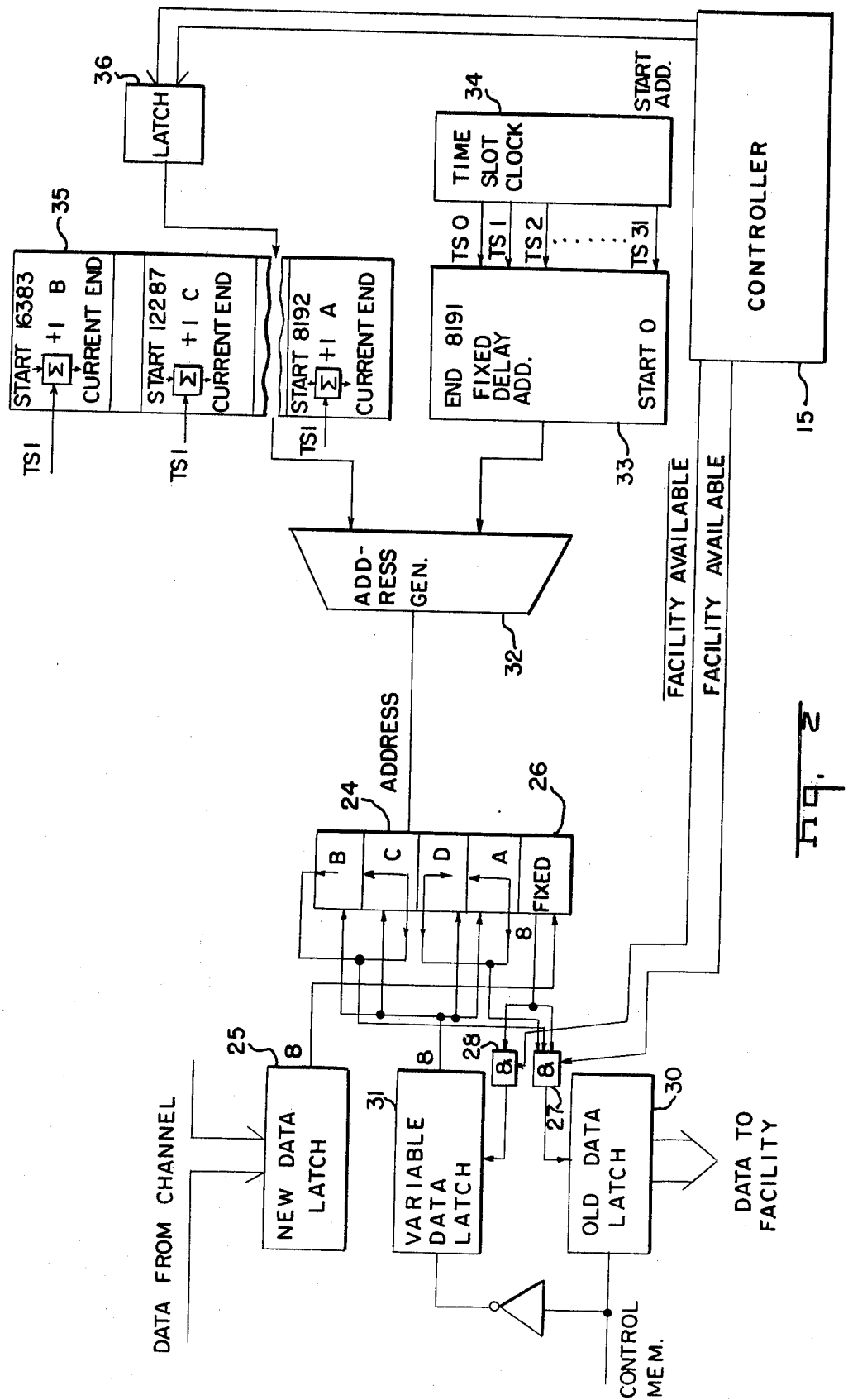

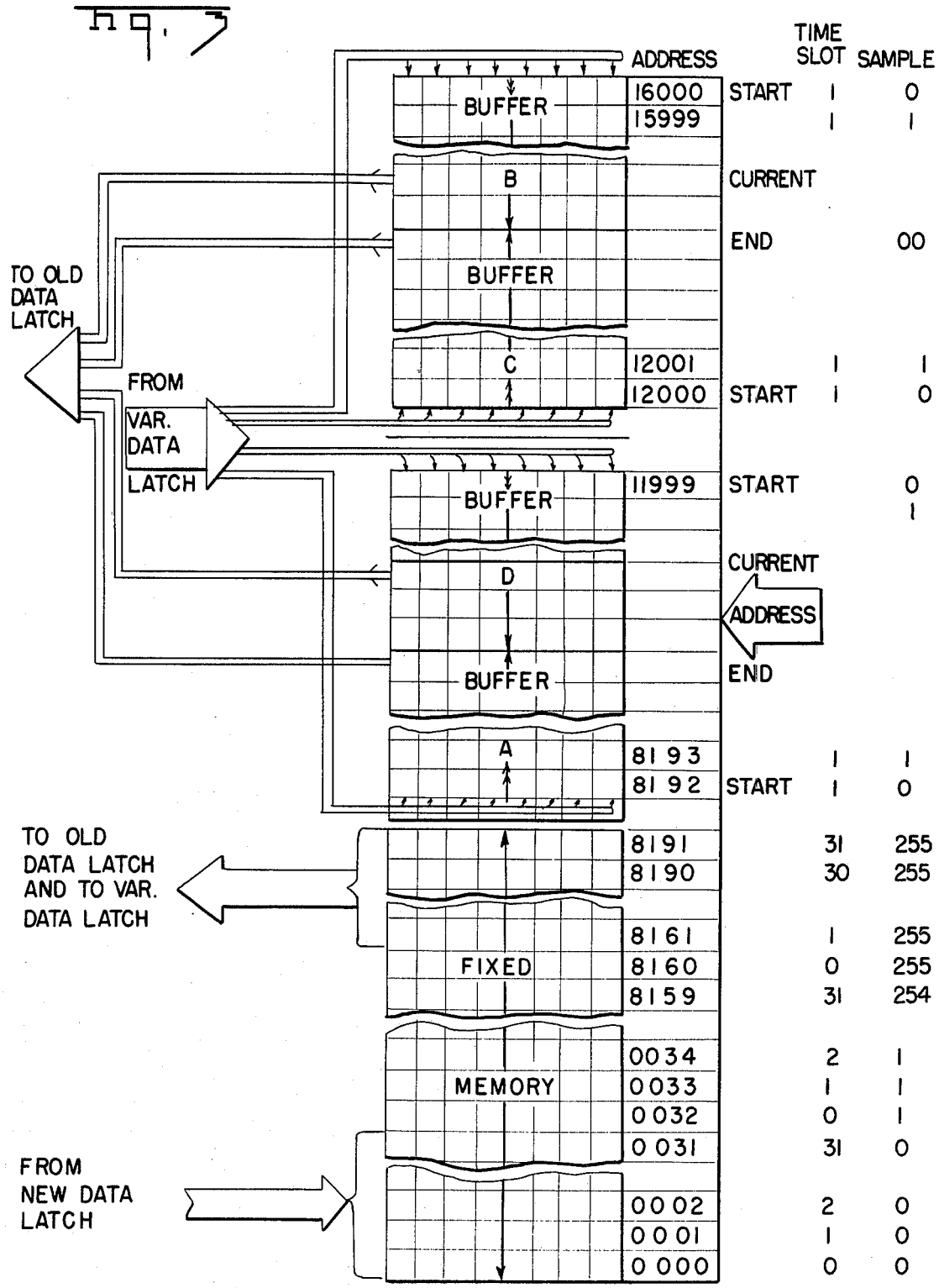

DIGITAL MEMORY PROVIDING FIXED AND VARIABLE DELAYS IN A TASI SYSTEM

REFERENCE TO PARENT APPLICATION

The present application is a continuation-in-part of application Ser. No. 863,903 filed Dec. 23, 1977.

BACKGROUND OF THE INVENTION

This invention relates to time assignment speech interpolation systems, and more particularly to a random access memory providing fixed and variable delays for such a system.

Because of the extremely high cost of communications transmission facilities, e.g. satellite channels and undersea transmission links, the prior art has sought various means to maximize the efficiency of existing transmission facilities. One such system is known as a time assignment speech interpolation (TASI) system. In a typical TASI system, calls from n callers are transmitted across, for example n/2 transmission facilities to a remote location. At that location, the n/2 facilities are connected to n output speech channels. TASI systems operate on the assumption, verified as a statistical fact, that at any given time not all callers will wish to talk simultaneously. In fact, as a general rule, callers are actively talking less than half of the time the talker and the listener are interconnected. Accordingly, TASI systems may be defined as switching systems which interconnect talker and listener only when the talker is actively speaking, provided there is a transmission facility available at that time.

"OVER-ALL CHARACTERISTICS OF A TASI SYSTEM" by J. M. Fraser, D. B. Bullock and N. G. Long, The Bell System Technical Journal, July 1962, pages 1439-1473 describes a TASI system. Such systems have been successfully used on undersea cables, for example, where a relatively large number of transmission facilities are available. Typically, thirty-six transmission facilities are available to transmit signals from seventy-four speech channels.

Another transmission facility, referred to as the order wire or control channel, is used to transmit disconnect signals to the remote location. FIG. 3 of the aforementioned article shows such a system.

RELATED APPLICATIONS

U.S. Pat. No. 4,147,896 which is assigned to the assignee of the present invention describes an improved TASI System in which the need for an order wire is eliminated. A symbol representing the input speech channel to which the transmission facility has been assigned is generated and transmitted prior to the signal. The invention of the Cannon et al application provides a fixed delay between the input speech channel and the transmission facility. This fixed delay provides an interval in which the symbol is generated and switching is performed without clipping the signal.

U.S. Pat. No. 4,153,816 which is assigned to the assignee of the present invention describes an improved TASI System in which a variable delay is provided between the input speech channel and the transmission facility. This variable delay is applied when no transmission facility is available. The delay extends until a facility becomes available. This prevents the loss of signals which would otherwise occur when no transmission facility is available. This situation, commonly referred to as "freeze out", is a particular problem in TASI systems with a small number of transmission facilities.

It is an object of the present invention to provide both the fixed and the variable delay in a random access memory.

SUMMARY OF THE INVENTION

In accordance with this invention, a time assignment speech interpolation system has a random access memory in which samples of detected signals are stored until the necessary switching and symbol generation are performed and until a transmission facility is available. When a transmission facility is available, the samples are reconstituted and transmitted on a transmission facility to a remote location.

In accordance with an important aspect of this invention, the portion of the memory assigned to provide the variable delay is divided into pairs of buffers which fill from the high address end and the low address end respectively. This provides optimum memory length flexibility for any given memory length by allowing each of the two variable capacity buffers to use any memory capacity not already used by the other buffer. In accordance with another embodiment of the present invention, the portion of the memory assigned to provide the variable delay is segmented. As one segment is filled, it is linked to another available segment.

In accordance with another important aspect of this invention, the allocation of the memory to fixed and variable buffers can be changed to provide the most efficient utilization of memory for a particular system configuration.

It has been proposed to use TASI systems of the type under consideration in communication networks where there are as few as four transmission facilities. In such a system, a large amount of memory must be allocated to provide a variable buffer which will hold samples until a transmission facility becomes available. On the other hand, when there are a large number of transmission facilities in the system, the required capacity of the variable buffers is not as large, and it can be configured in a different way to provide most efficient usage. The use of a random access memory in accordance with this invention provides flexibility to most efficiently utilize the memory.

The foregoing and other objects, features and advantages of the invention will be better understood from the following more detailed description and appended claims.

DESCRIPTION OF THE DRAWINGS

FIG. 2 is a block diagram of the present invention;

FIG. 3 shows the random access memory in more detail;

DESCRIPTION OF THE PREFERRED EMBODIMENT

Figure 1:
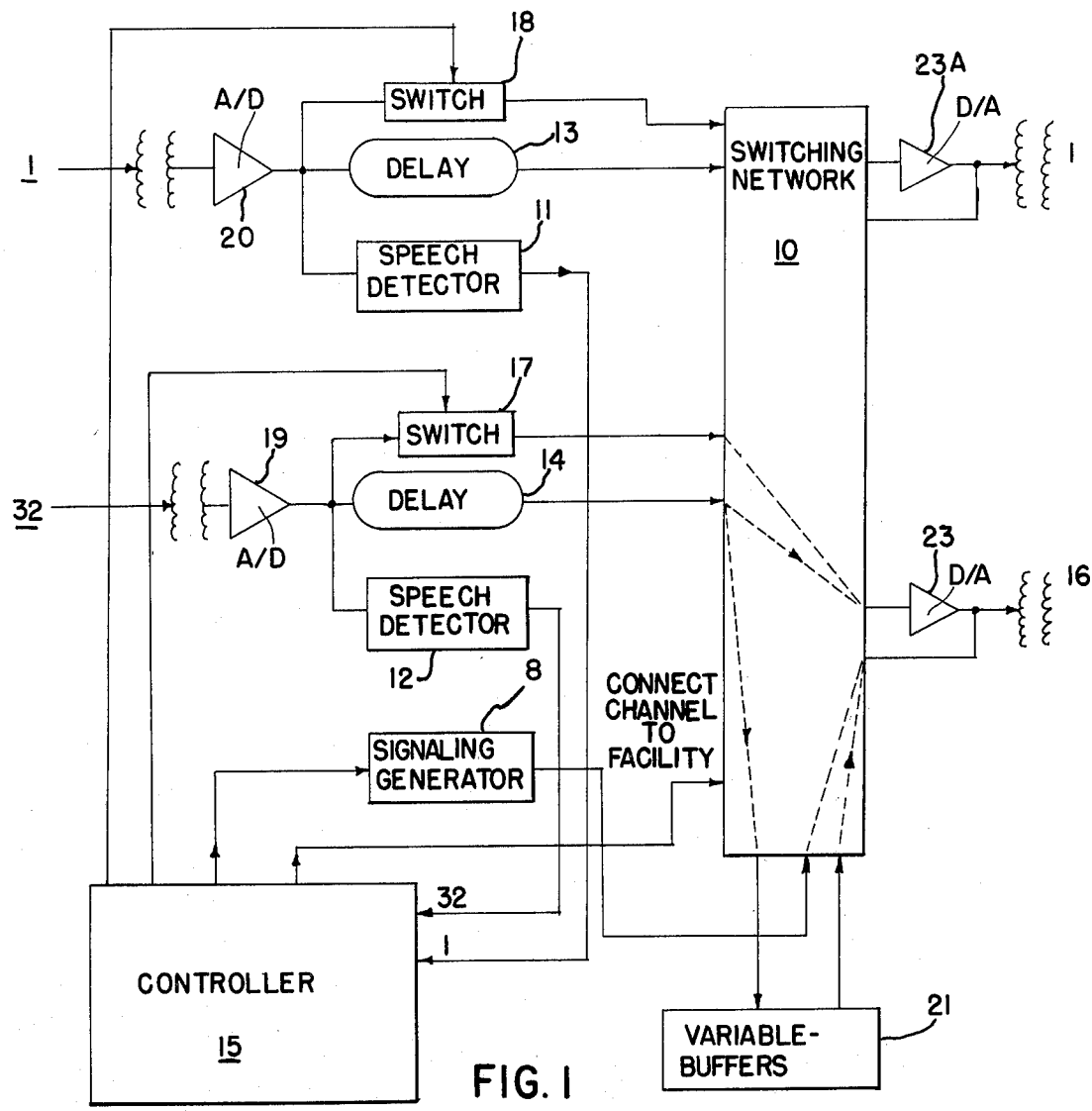
FIG. 1 is a block diagram of the transmitting side of a TASI System.

Before describing the present invention, the sending side of a TASI system will first be described with reference to FIG. 1.

In this example, there are 32 input speech channels of which only channel 1 and channel 32 have been shown. As is conventional in such systems, signals from the input speech channel are applied to switching network 10 which selectively connects an input speech channel to an available transmission facility 1 . . . 16. Only transmission facilities 1 and 16 have been shown. Typically, there are half as many transmission facilities as there are input speech channels. Speech detectors 11, 12 and others, detect the presence of a signal on an input channel. In response to the detection of a signal on the input channel, a controller 15 operates switching network 10 to connect the input speech channel to an available transmission facility. FIG. 1 shows input speech channel 32 connected to transmission facility 16.

Fixed delays 13, 14 and others are connected between each input speech channel and switching network 10. The delays 13 and 14 provide a time interval during which a symbol from signalling generator 8 is applied to the transmission facility. This symbol from signalling generator 8 identifies the input speech channel to which the transmission facility has been assigned. For example, assume transmission facility 16 has been assigned to input speech channel 32. Signalling generator 8 generates a symbol representing input channel 32. This is applied to the transmission facility 16 before the speech signal, sometimes referred to as a speech burst. The delay 14 provides the time interval required to insert the symbol before the speech signal.

Switches 17 and 18 are in a circuit in parallel with the fixed delay. These provide the capability of switching the fixed delay out of the sending side of the system after the first speech burst as long as a transmission facility is connected to that channel.

Signals from the input channels are converted into digital (P.C.M.) form by means of the analog-to-digital converters 19 and 20. These digital signals may be stored for variable times in variable delay buffers 21, and then transmitted on a facility when a facility becomes available. This is described in the aforementioned application of William A. Morgan. The digital signals are reconstituted back to analog by the digital-to-analog converters 23 and 23A before the signals are applied to the transmission facilities.

In accordance with the present invention, the fixed delays 13 and 14 and the variable delay buffers 21 are provided in a single random access memory 24 which is shown in FIG. 2.

Digital samples from a channel are transferred from the channel to the new data latch 25. These eight bit samples are then transferred to a fixed portion 26 of random access memory 24. The samples are stored in the fixed portion 26 for a fixed time. Thereafter, the samples are applied to gating means, including AND circuits 27 and 28 which respond to controller 15. If a transmission facility is available AND gate 27 is enabled. In this case, digital samples are applied to old data latch 30 from which they are transferred to the digital-to-analog converter to be reconstituted into an analog signal which is transmitted on an available facility.

If no transmission facility is available, AND gate 28 is enabled. In this case, samples are first set into the variable data latch 31 and then transferred to one of the buffers A,B,C or D in the variable portion of random access memory 24. In one embodiment, the buffers are paired. As shown in FIG. 2, buffers B and C are paired and A and D are paired. The buffers are filled from the high address end and the low address end respectively. That is, buffer B is filled from the high address end, and buffer C is filled from the low address end. Buffer D is filled from the high address end and buffer A is filled from the low address end. The dividing line between buffers in a pair is at a variable location. This provides memory length flexibility by allowing each buffer to use memory capacity not already used by the other buffer in the pair.

Addresses for storing samples in and reading samples from random access memory 24 are generated by the address generator 32. Addresses for the fixed portion of memory are generated by the fixed delay address generator 33. This responds to a time slot clock 34 which generates a signal defining a plurality of time intervals which are applied to fixed delay generator 33. In the example under consideration, the clock 34 generates thirty-two different time slots denoted TS 0, TS 1 . . . TS 31. The cycle is repetitive. Address generator 33 generates memory addresses in cycles which are repetitive after a fixed delay. The addresses are applied to the fixed portion 26 of memory 24 so that successive samples are stored in memory locations and read out of that location after a fixed delay.

When a sample is read out of the fixed portion 26 of memory, it may be stored in the variable portion of memory at an address which is generated by the variable buffer control memory 35. In the example under consideration, the starting address of buffer A is memory location 8192, the starting address of buffer D is 12287, the starting address of buffer C is 12288 and the starting address of buffer B is 16384. Controller 15 sets a starting address of one of the four buffers into latch 36. Thereafter, the starting address is incremented or decremented by 1 by the time slot clock 34. In this manner, a current address is generated for the storage or readout of samples from the variable portion of the memory.

FIG. 3 shows the 8×16K random access memory 24 in more detail. The fixed portion of memory includes the eight-bit storage locations having addresses from 0000 to 8191. In the example under consideration, the thirty-two time slots from the time slot clock are used to poll each of the thirty-two channels. Two hundred fifty-six memory locations are provided for each channel. The first sample from the first channel is stored in location 0000. The first sample from the second channel is stored in location 0001 . . . , the first sample from channel 32 is stored at address 0031. The second sample from channel 1 is stored at address 0032. The second sample from channel 2 is stored at address 0033 and so on. The two hundred fifty-sixth sample from channel 1 is stored at address 8160. Thereafter, the first sample from channel 1 is read out of storage location 0000, and the next sample is stored therein. Each sample remains in memory for a fixed delay of 32 milliseconds.

In the variable portion of memory, address locations 8192 through 12287 are allocated to the variable buffers A and D. Buffer A is filled starting with address 8192 and buffer D is filled starting with address 12287. Buffer C is filled starting with address 12288 and buffer D is filled starting with storage location 16384.

Upon selection of a buffer, it expands with each new sample transferred from fixed memory until a facility becomes available. If the end addresses of both buffers come together before a transmission facility becomes available, speech will be lost, but it can be statistically shown that this occurs infrequently.

Figures 4A, 4B:
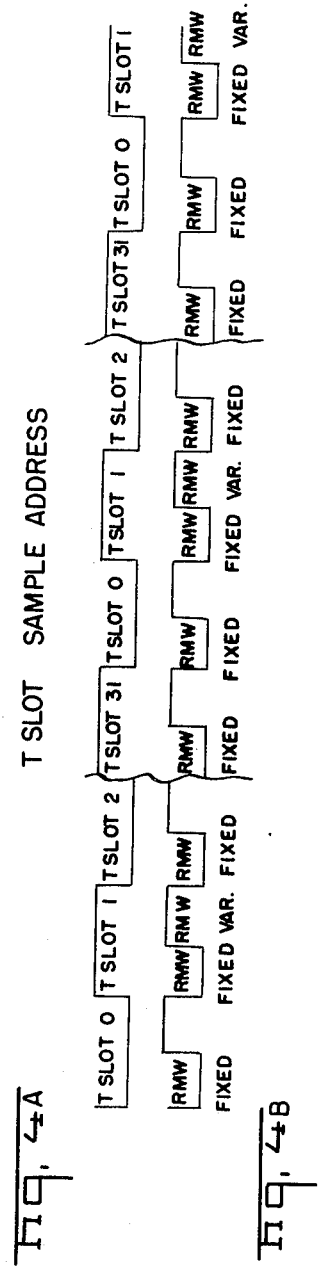
FIG. 4A depicts the output of the time slot clock.
FIG. 4B depicts the memory read and write operations within each time slot.

FIG. 4A shows the time slots generated by the clock 34.

FIG. 4B indicates the read, modify and write operations (RMW) which are performed during each time slot. The operation of the system will now be described.

At the beginning of each time slot, a PCM digital sample from a channel is latched into new data latch 25. A memory read operation is initiated. If a transmission facility is available, a sample is transferred from a location in the fixed portion 26 of memory to the old data latch 30. During this same time slot, the sample in the new data latch is written into that same storage location, thereby replacing the oldest speech sample with the newest.

The operation is different if a variable buffer is in use. This can be because no transmission facility is currently available, or because no transmission facility was available at the start of some previous talk burst, and the buffer inserted then is still in use (because no sufficiently long pause has occurred for removing it).

When a buffer is in use, the beginning of a time slot latches a sample from the channel into the new data latch 25 just as before. A memory read operation is performed in the fixed delay section and the sample read out is latched into the variable data latch 31. Variable buffer control memory 35 generates the address for the current location of the buffer being used. During the last half of the current time slot, a read operation is performed at this memory location. The sample read out is stored in the old data latch 30. If the buffer is in its expanding mode (no facility is available, and space for expansion is still available), this sample dies in the data latch. If the buffer is in its closed mode (a facility has been assigned to the speech in the buffer, and the buffer acts as a fixed delay), the sample read out at this time is eventually passed to the facility.

The final action in the last half of the time slot is to write the current address of the variable buffer with the sample stored in the variable data latch 31. This can be the same operation whether the buffer is expanding or closed.

The invention as described above has four variable buffers and a fixed memory with 8K storage locations. However, one of the important advantages of the present invention is that the number of buffers and the amount of storage allocated to fixed memory can be easily changed. The system described above has thirty-two channels, but in practice the number of channels varies. A system of this type can have as few as eight channels. The allocation of memory locations to fixed and variable buffers can be changed to most efficiently use the memory. Where the number of transmission facilities is small, a larger capacity variable buffer should be provided to prevent freeze out.

As an example of the manner in which the allocation of memory is changed, depending upon the number of channels, the following lists the allocation of a 16K memory for system configurations of 32, 16 and 8 channels:

| NUMBER OF CHANNELS | FIXED MEMORY ALLOCATION | VARIABLE MEMORY ALLOCATION | NUMBER OF BUFFERS |
| --- | --- | --- | --- |
| 32 | 8192 | 8197 | 4 |
| 16 | 4096 | 12288 | 2 or 4 |
| 8 | 2048 | 14336 | 2 |

With only eight channels, it has been found that the best configuration is to provide two buffers with a combined capacity of 14K. In this case, it is not likely that there will be speech on more than two channels at a time when no transmission facility is available. Therefore, providing only two buffers is sufficient. However, when no transmission facility is available, the wait for a facility is likely to be long. Hence, providing a long buffer length, up to 14K, is useful.

On the other hand, when there are thirty-two channels, it is likely that there will be more channels requiring buffering while waiting for a transmission facility to become available. Therefore, the variable memory is divided into four buffers. Each buffer has a maximum length of only 4K, but this is sufficient because it can be shown statistically that the wait for an available facility will be shorter than in systems where there are fewer channels.

Figure 5:
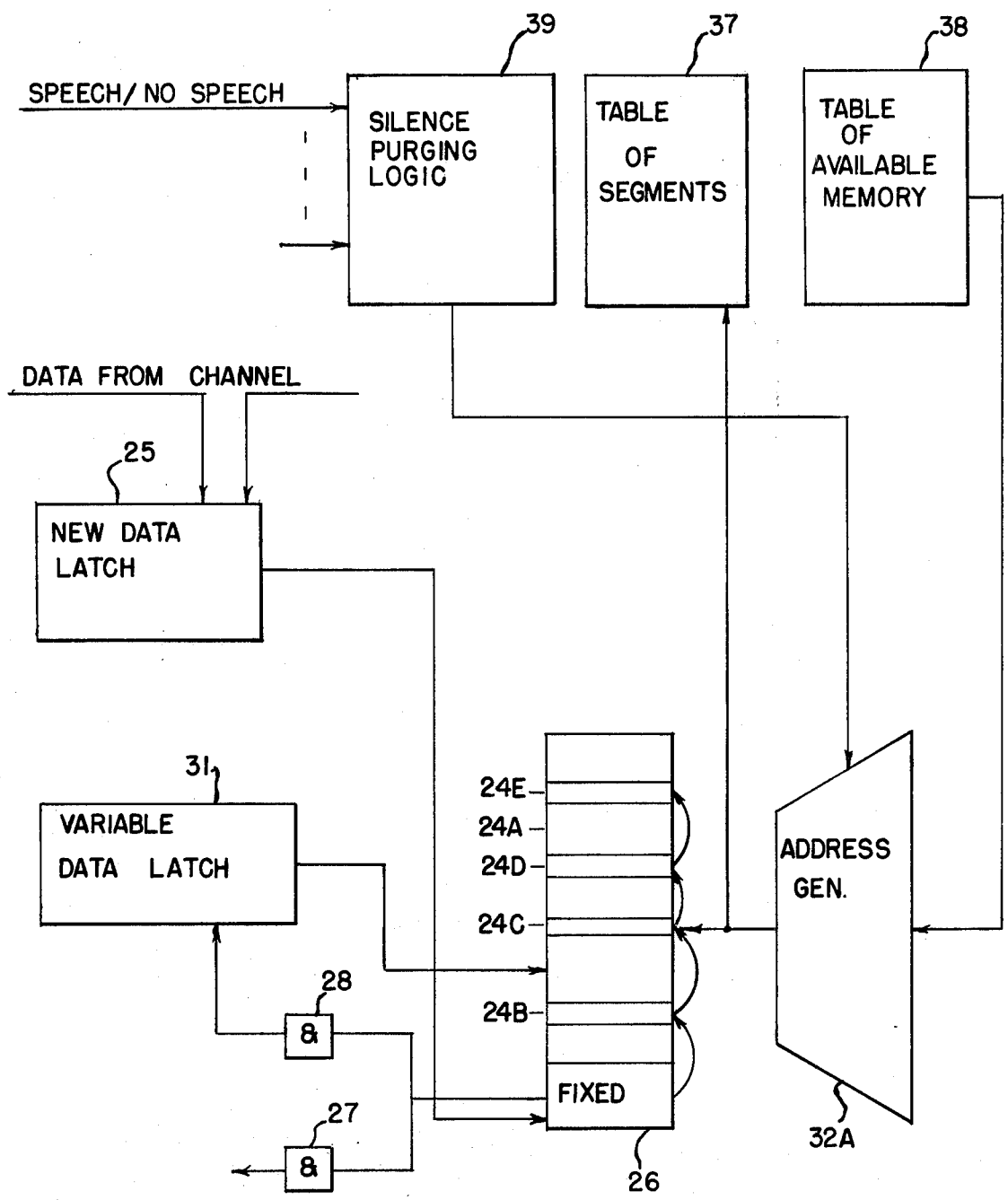
FIG. 5 shows another embodiment of the present invention.

The following are examples of components which have been used in one implementation of the invention:

Controller 15: Intel 8085 Microprocessor
RAM 24: MR 4116
Latch 25, 30, 31 and 36: 74LS374
AND Gates 27 and 28: 74LSXX Logic Family
Address Generators 32 and 33: 74LS257, 74LS1694
Clock 34: Crystal Oscillator and 74LSXX Family
Control Memory 35: Intel 2101A FIG. 5 shows a modification of the invention in which the variable portion of random access memory 24A-E has linked segments instead of being divided into paired buffers as described in FIG. 2. In this embodiment, digital samples from variable data latch 31 are transferred to a segment of random access memory 24A-E which is available. As one segment becomes full, it is linked with another available segment. For example, segments 24B-24E may be linked together to provide a variable length buffer for a channel. The length of each segment is fixed, but any number of segments may be linked together to form different buffer lengths as required. This technique provides the optimum usage of memory capacity. Addresses of available segments are generated by address generator 32A. A table of assigned segments is maintained in a first portion 37 of controller 15 with data to indicate which buffer a segment belongs to at any instant. A second portion 38 of the controller 15 contains a table of available memory locations and is used to generate the address of the next memory location into which the word is to be stored.

When memory 24 is segmented, the channel speech detectors, such as 11 and 12, may be monitored by the controller 15. The controller 15 identifies which, if any, of the assigned segments have silences or pauses in the stored speech. Silence purging logic 39, responsive to the controller 15, then removes the addresses of those segments identified as containing silence from the table in the first portion 37 and classifies them as available in the table of available memory locations in the second portion 38 of the controller 15.

While particular embodiments of the invention have been shown and described, various modifications are within the true spirit and scope of the invention. The appended claims are intended to cover all such modifications.

What is claimed is:

1. A time assignment speech interpolation system comprising:

means for sampling signals detected on each input speech channel;

a random access digital memory connected between said input speech channels and transmission facilities extending to a remote location, said samples being stored in a fixed portion of said memory for a fixed time;

an address generator for generating addresses in a variable portion of said memory which stores said samples in linked segments of said variable portion;

control means having a first portion for storing the addresses of said samples in said linked segments of said variable portion for variable times until a transmission facility is available and subsequently for retrieving said samples in said linked segments for transmission to a transmission facility.

2. The system recited in claim 1 wherein said control means further comprises a second portion for storing a table of available addresses in said variable portion, said address generator being responsive to said second portion.

3. The system of claim 1 wherein said signals are detected on said input channels by means of speech detectors, said control means being responsive thereto and further comprising:

a logic circuit responsive to said control means for removing the addresses of those segments of said linked segments in which no samples have been stored from said first portion.

4. The system of claim 3 wherein the addresses of said removed segments are stored in said first portion.

* * * * *

UNITED STATES PATENT AND TRADEMARK OFFICE
CERTIFICATE OF CORRECTION

PATENT NO. : 4,284,850
DATED : August 18, 1981
INVENTOR(S) : Glenn R. Clingenpeel It is certified that error appears in the above—identified patent and that said Letters Patent is hereby corrected as shown below:

The term of this patent subsequent to January 15, 1997, has been disclaimed.

Signed and Sealed this

Twenty-ninth Day of December 1981

[SEAL]

Attest:

GERALD J. MOSSINGHOFF

Attesting Officer     Commissioner of Patents and Trademarks